(12) United States Patent
Garaud et al.

(10) Patent No.: US 6,454,236 B2
(45) Date of Patent: Sep. 24, 2002

(54) ELASTIC DEVICE FOR SUSPENDING A VIBRATING STRUCTURE ON A RIGID STRUCTURE

(75) Inventors: Patrick Garaud, St-Denis-les-Ponts (FR); Gilles Chenais, Marboue (FR); Vincent Salembier, Brunelles (FR)

(73) Assignee: Hutchinson, Paris (FR)

( * ) Notice: Subject to any disclaimer, the term of this patent is extended or adjusted under 35 U.S.C. 154(b) by 0 days.

(21) Appl. No.: 09/799,783

(22) Filed: Mar. 6, 2001

(30) Foreign Application Priority Data

Mar. 6, 2000 (FR) .............................................. 00 02839

(51) Int. Cl.[7] .............................................. F16M 13/00
(52) U.S. Cl. ......................... 248/635; 248/60; 248/638; 267/141; 267/152
(58) Field of Search ............................. 248/60, 58, 610, 248/635, 634, 638; 267/141, 152, 153; 180/296, 291, 312, 89.2

(56) References Cited

U.S. PATENT DOCUMENTS

| | | | |
|---|---|---|---|
| 4,942,075 A | * | 7/1990 | Hartel et al. |
| 5,050,837 A | | 9/1991 | Hamada et al. ............. 248/610 |
| 5,364,061 A | * | 11/1994 | Ciolczyk et al. |
| 5,788,209 A | * | 8/1998 | Dandre et al. |
| 6,070,849 A | | 6/2000 | Larmande et al. .......... 248/610 |

FOREIGN PATENT DOCUMENTS

| | | |
|---|---|---|
| EP | 0 411 246 | 2/1991 |
| EP | 0509918 | * 10/1992 |
| EP | 0 979 930 | 2/2000 |
| FR | 2674800 | * 4/1991 |
| FR | 2 758 602 | 7/1998 |
| JP | 08004816 | 1/1996 |
| JP | 09296848 | 11/1997 |

OTHER PUBLICATIONS

French Preliminary Search Report dated Nov. 28, 2000, Appl. No. FR 0002839.

* cited by examiner

*Primary Examiner*—Korie Chan
(74) *Attorney, Agent, or Firm*—Marshall, Gerstein & Borun

(57) ABSTRACT

This device comprises an elastic element designed to be stretched between two fixing members spaced apart from one another in a direction of vibration and which are linked to one another by two elastomer branches, these branches extending substantially in the vibration direction. A vibrating mass links said branches to one another. This vibrating mass is provided in the form of a ring enclosing the elastic element so as to form two stop zones located respectively in the vicinity of the two fixing members in order to limit displacements of the latter under traction.

5 Claims, 2 Drawing Sheets

ELASTIC DEVICE FOR SUSPENDING A VIBRATING STRUCTURE ON A RIGID STRUCTURE

TECHNICAL FIELD

The present invention relates to devices for suspending a vibrating structure on a rigid support structure, in particular for suspending an exhaust pipe of a motor vehicle on the body of the latter.

More specifically, the invention relates to a device for suspending a vibrating structure on a rigid support structure comprising:

an annular elastic element comprising two fixing members designed to be linked respectively to two structures, said fixing members being spaced apart from one another in what is referred to as a vibration direction and being linked to one another by two elastomer branches extending substantially in the vibration direction, and at least one vibrating mass, designed to filter high frequency vibrations, linking said branches to one another.

BACKGROUND ART

A known device of this type is illustrated in FIG. 1 of the appended drawings, whilst FIG. 2 provides a theoretical equivalent diagram of this device and FIG. 3 a diagram of the stiffness K obtained as a function of the frequency f of the vibrations acting between the fixing members 1 and 2 of the elastic element A of the device, which is made from rubber for example. As illustrated in FIG. 2, each elastomer branch 3 may be a spring R and a damper C mounted in series between the body 20 of a motor vehicle and its exhaust pipe 21, the vibrating mass M being linked to the two branches 3 between their respective spring R and damper C. The purpose of this known technique is illustrated in FIG. 3 and resides in the filtering of high frequency vibrations, made possible by incorporating the vibrating mass M.

The disadvantage of this device essentially resides in the fact that it does not allow displacements of the vibrating structure relative to the rigid support structure to be limited when the rigid structure is subjected to very high traction forces, particularly in the vertical direction. As a result, there is a risk that the elastic device will deteriorate.

Another disadvantage of this device resides in the shape of the mass M and its relative disposition with respect to the device. As may be seen from FIG. 1, the mass M is provided in the form of a rigid bar, the two opposite ends of which are embedded respectively in the two branches 3 of the elastic element A. Consequently, the two branches are no longer continuous, which tends to impair the fatigue strength of the device.

BRIEF SUMMARY OF THE INVENTION

The objective of the present invention in particular is to remedy these drawbacks.

To this end, the suspension device proposed by the invention is characterised in that the vibrating mass is provided in the form of a ring, which encloses the elastic element so as to form two stop zones located respectively in the vicinity of the two fixing members in order to restrict displacements of the latter under traction.

Displacements of the vibrating structure under traction relative to the rigid support structure are therefore perfectly limited by the shape and disposition of said vibrating mass and the device is also very easy and inexpensive to manufacture.

In preferred embodiments of the suspension device proposed by the invention, one and/or the other of the following features may also be incorporated:

the elastic element comprises an elastomer block, provided with a recess defining firstly one of said branches of the elastic element and secondly two compression stop zones directed one towards the other on a level with the fixing members;

the vibrating mass has two sections which run respectively alongside the two branches of the elastic element, each being provided with a projection oriented in the direction of the elastic element, said ring being linked to the elastic element by over moulding and each of said branches of the elastic element being adhered respectively to each of said projections;

the vibrating mass is metallic;

the vibrating mass is covered with an elastomer layer made in one piece with the elastic element;

the elastomer layer completely encases the vibrating mass.

Other features and advantages of the invention will become clear from the following description of one of its embodiments, given by way of illustration only and not restrictive in any respect, and with reference to the appended drawings.

DETAILED DESCRIPTION OF THE INVENTION

Figure 1:
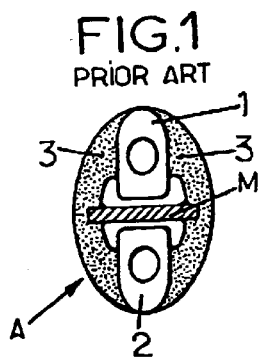
FIG. 1 is a view of device of the prior art.
Figure 2:
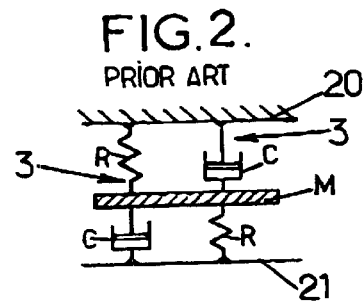
FIG. 2 is a theoretical equivalent diagram of the device illustrated on FIG. 1.
Figure 3:
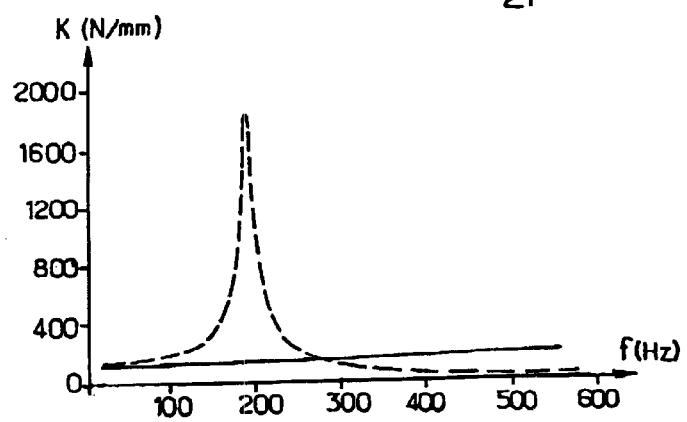
FIG. 3 is a diagram of the stiffness as a function of the frequency for the device illustrated on FIG. 1.
Figure 4:
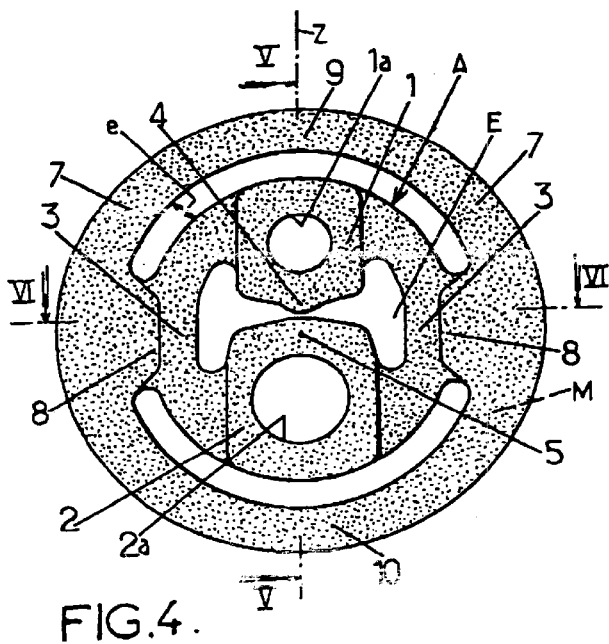
FIG. 4 is a view in elevation of a suspension device as proposed by the invention.
Figure 5:
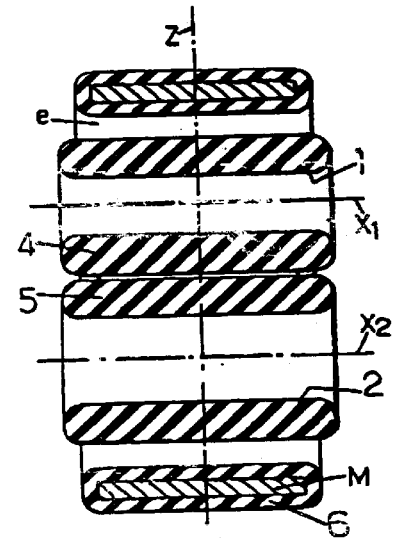
FIG. 5 is a view in section of the device illustrated in FIG. 4, the section being taken along the line V—V of FIG. 4.
Figure 6:
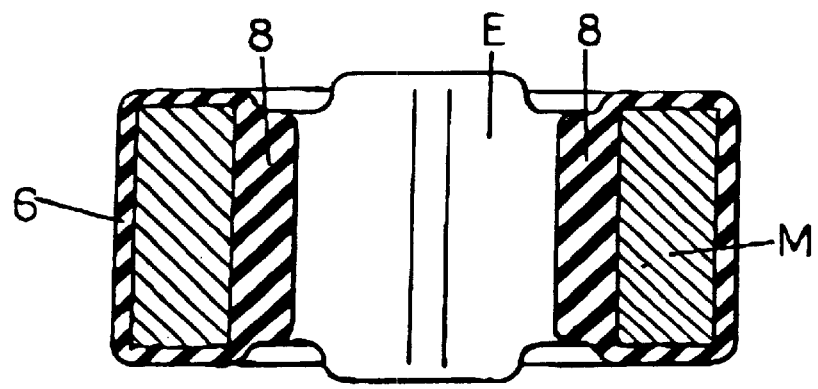
FIG. 6 is a view in section of the device illustrated in FIG. 4, the section being taken along the line VI—VI of FIG. 4.

The device illustrated in FIGS. 4 to 6 comprises an elastic element A which consists of a single elastomer body comprising two blocks 1 and 2 or other fixing members. These blocks have holes 1a and 2a to enable insertion of hooking members linked on the one hand to a part of the body of a vehicle (not illustrated) or any other support structure and, on the other, to an exhaust pipe (not illustrated) or other vibrating element. The holes 1a and 2a are centred respectively on substantially horizontal axes X1 and X2. The element A has a substantially H-shaped recess E, which delimits two elastic lateral branches 3 in the elastomer, said branches being substantially parallel and extending in a direction of vibration Z which is substantially vertical and perpendicular to the axes X1 and X2.

The blocks 1 and 2 form two compression stop zones 4 and 5 disposed face to face. The element A has a high compression stiffness under the action of any vertical forces tending to move the two hooking members closer together, for example under the effect of impacts, which comes into play immediately the two zones 4 and 5 come into contact with one another.

The device illustrated in FIGS. 4 to 6 additionally has a vibrating mass M which is provided in the form of a rigid ring, made from steel for example, which encloses the elastic element A leaving a slight clearance e in the direction Z. This clearance may be provided in the form of two arcuate slits e, for example, each disposed between each block 1, 2 of the elastic element A and the vibrating mass M.

In the example illustrated, the ring M is generally substantially circular in shape. By preference, it is fully encased in a layer of elastomer 6 which is made in one piece with the material of the block of element A, the purpose being to prevent corrosion and enable the unit to be moulded in a single piece. The suspension device obtained is therefore easy to manufacture and inexpensive.

The ring M has two diametrically opposed sections 7 which run respectively alongside the lateral branches 3 of the element A. In the median region of the two sections 7, the elastomer layer 6 has two bosses B directed towards the element A, each boss being moulded and adhered to the outer surface of the lateral branch 3 co-operating with it, preferably in the median region of the latter. The lateral branches 3 of the element A therefore preserve their continuity, imparting improved fatigue strength to the device proposed by the invention.

Said ring M also has two diametrically opposed sections 9, 10 linking the two sections 7 to one another, section 9 running alongside block 1 of the element A and section 10 running alongside block 2. Advantageously, said sections 9, 10 respectively form two stop zones against which the blocks 1, 2 of the element A are applied if the blocks are subjected to vertical forces tending to move them apart from one another.

Figure 7:
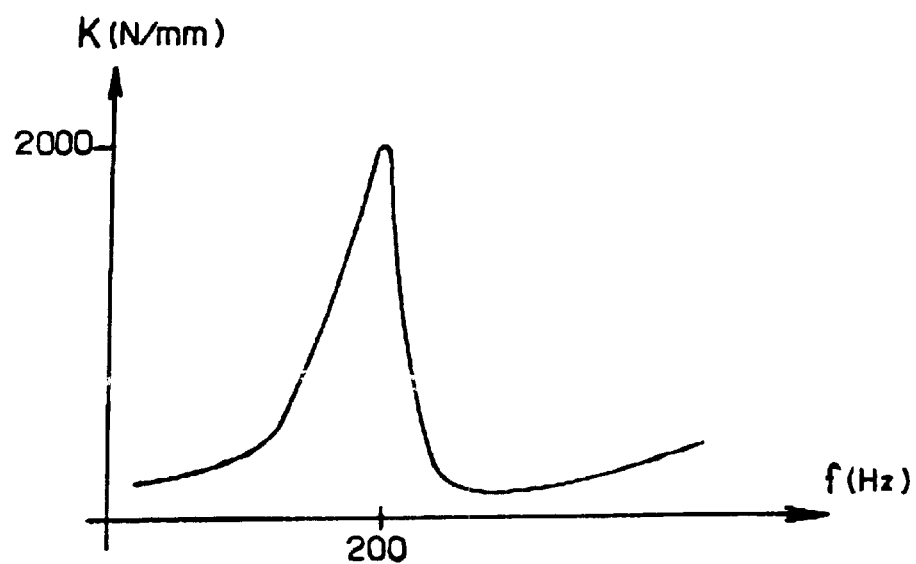
FIG. 7 is a diagram showing changes in the stiffness K of this device as a function of the frequency f of the vibrations.

With this assembly, the response illustrated in FIG. 7 is obtained in terms of stiffness K, with the same conventions as above. It is clear that the stiffness K is low at high frequencies because of the invention, which means that the device is able to filter these frequencies effectively.

It goes without saying that the embodiment described above is intended purely as an illustration and is not restrictive in any respect and that numerous modifications may easily be made by the person skilled in the art without departing from the scope of the invention. For example, instead of being encased in an elastomer layer 6 made in a single piece with the body of the element A, the ring M may be left bare. In this case, this ring may be provided with two internal projections, preferably diametrically opposed, by means of which it is directly linked to the element A, each projection being adhered to the outer surface of the lateral branch 3 of the element A co-operating with it, preferably in the median region of the latter.

What is claimed is:

1. A device for suspending a vibrating structure on a rigid support structure, in particular for suspending an exhaust pipe of a motor vehicle on the body of the latter, of the type comprising:

an annular elastic element having fixing members designed to be linked respectively to said vibrating structure and said rigid structure, said fixing members being spaced apart from one another in a vibration direction and being linked to one another by two elastomer branches extending substantially in the vibration direction, and at least one vibrating mass designed to filter high frequency vibrations, linking said branches to one another, wherein the vibrating mass is provided in the form of a ring which encloses the elastic element so as to form two stop zones located respectively in the vicinity of the two fixing members in order to limit displacements of the latter under traction, said vibrating mass having two sections which run alongside the two branches of the elastic element, each being provided with a projection oriented in the direction of the elastic element, said ring being linked to the elastic element by over moulding and each of said branches of the elastic element being adhered respectively to each of said projections.

2. A device as claimed in claim 1, in which the elastic element has an elastomer block provided with a recess defining said branches of the elastic element on the one hand, and two compression stop zones directed towards one another on the level of the fixing members on the other.

3. A device au claimed in claim 1, in which the vibrating mass is metallic.

4. A device as claimed in claim 1, in which the vibrating mass is encased in an elastomer layer which is made in a single piece with and from the material of the elastic element.

5. A device as claimed in claim 4, in which the elastomer layer completely encases the vibrating mass.

* * * * *